United States Patent
Zaghib et al.

(10) Patent No.: US 9,870,873 B2
(45) Date of Patent: Jan. 16, 2018

(54) PARTICLES CONTAINING A NON-CONDUCTING OR SEMI-CONDUCTING NUCLEUS COVERED WITH A HYBRID CONDUCTING LAYER, THEIR PROCESSES OF PREPARATION AND USES IN ELECTROCHEMICAL DEVICES

(71) Applicant: HYDRO-QUEBEC, Montreal (CA)

(72) Inventors: Karim Zaghib, Longueuil (CA); Patrick Charest, Sainte-Julie (CA); Abdelbast Guerfi, Brossard (CA); Michel Perrier, Montreal (CA); Kimio Kinoshita, Cupertino, CA (US)

(73) Assignee: HYDRO-QUEBEC, Montreal, Quebec (CA)

( * ) Notice: Subject to any disclaimer, the term of this patent is extended or adjusted under 35 U.S.C. 154(b) by 663 days.

(21) Appl. No.: 14/220,716

(22) Filed: Mar. 20, 2014

(65) Prior Publication Data

US 2014/0205911 A1 Jul. 24, 2014

Related U.S. Application Data

(60) Division of application No. 12/533,817, filed on Jul. 31, 2009, which is a continuation of application No.
(Continued)

(30) Foreign Application Priority Data

Jul. 12, 2002 (CA) ...................................... 2394056

(51) Int. Cl.
*H01M 4/131* (2010.01)
*H01M 4/485* (2010.01)
(Continued)

(52) U.S. Cl.
CPC ......... *H01G 11/46* (2013.01); *B02C 17/1815* (2013.01); *H01G 11/32* (2013.01);
(Continued)

(58) Field of Classification Search
CPC .... H01M 4/131; H01M 4/485; H01M 10/052; H01M 10/0565; H01M 4/366; H01M 4/625; H01M 10/0525; H01M 4/661
See application file for complete search history.

(56) References Cited

U.S. PATENT DOCUMENTS 2,701,208 A 2/1955 Blau
4,536,435 A 8/1985 Utsumi
(Continued)

FOREIGN PATENT DOCUMENTS

EP  1 032 062 A1  8/2000
EP  1 049 182     11/2000
(Continued)

OTHER PUBLICATIONS

"Composite". Oxford English Dictionary. Oxford University Press. 2013. Web. Accessed: May 9, 2014. <http://www.oed.com/view/Entry/37791?rskey=DNvOQi&result=1#eid>. (1 page).
(Continued)

*Primary Examiner* — Barbara Gilliam
*Assistant Examiner* — Angela Martin
(74) *Attorney, Agent, or Firm* — Buchanan Ingersoll Rooney PC

(57) ABSTRACT

Mixture of particles comprising a non-conducting or semi-conducting nucleus covered with a hybrid conductor coating and hybrid conductor chains located between the particles of the mixture to constitute a conductivity network, that is prepared by mechanical crushing. Due to a very good conductivity of the network, a low resistivity, a very good capacity under elevated current and/or a good density of
(Continued)

energy, these mixtures of particles are advantageously incorporated in anodes and cathodes of electrochemical generators, resulting in highly performing electrochemical systems.

31 Claims, 5 Drawing Sheets

Related U.S. Application Data

10/521,365, filed as application No. PCT/CA03/01050 on Jul. 10, 2003, now abandoned.

(51) Int. Cl.

| | |
|---|---|
| *H01M 10/052* | (2010.01) |
| *H01M 10/0565* | (2010.01) |
| *H01M 10/0525* | (2010.01) |
| *H01G 11/46* | (2013.01) |
| *H01M 4/36* | (2006.01) |
| *H01M 4/62* | (2006.01) |
| *B02C 17/18* | (2006.01) |
| *H01G 11/32* | (2013.01) |
| *H01M 4/66* | (2006.01) |

(52) U.S. Cl.
CPC ........... *H01M 4/131* (2013.01); *H01M 4/366* (2013.01); *H01M 4/485* (2013.01); *H01M 4/625* (2013.01); *H01M 4/661* (2013.01); *H01M 10/052* (2013.01); *H01M 10/0525* (2013.01); *H01M 10/0565* (2013.01)

(56) References Cited

U.S. PATENT DOCUMENTS

| | | | | |
|---|---|---|---|---|
| 4,546,435 | A | | 10/1985 | Utsumi et al. |
| 5,521,026 | A | | 5/1996 | Brochu et al. |
| 5,545,468 | A | * | 8/1996 | Koshiba ................ H01M 4/485 429/231.1 |
| 5,789,114 | A | | 8/1998 | Adachi et al. |
| 6,221,531 | B1 | * | 4/2001 | Vaughey ............... H01M 4/485 423/598 |
| 6,638,662 | B2 | * | 10/2003 | Kaneda ................ H01M 4/133 429/218.1 |
| 6,855,273 | B2 | | 2/2005 | Ravet et al. |
| 2004/0048152 | A1 | | 3/2004 | Yata et al. |

FOREIGN PATENT DOCUMENTS

| | | |
|---|---|---|
| EP | 1 261 050 | 11/2002 |
| JP | 06-295744 | 10/1994 |
| JP | 2000-340209 | 12/2000 |
| JP | 2001-015111 | 1/2001 |
| JP | 2001-123871 A | 5/2001 |
| JP | 2002-117834 | 4/2002 |
| JP | 2003-282146 A | 10/2003 |
| WO | WO 01/97303 | 12/2001 |
| WO | WO 02/27823 | 4/2002 |
| WO | WO 02/46101 | 6/2002 |
| WO | WO 03/078326 A1 | 9/2003 |

OTHER PUBLICATIONS

Office Action issued by the U.S. Patent and Trademark Office in the U.S. Appl. No. 12/533,817 dated May 28, 2014, U.S. Patent and Trademark Office, Alexandria, VA (14 pages).

International Search Report dated Dec. 16, 2003 in corresponding PCT/CA03/01050.

Stein et al., "Mechanofusion for High Performance Particles", Process Engineering, Jan. 2002, pp. E11-E15, vol. 79, No. 4.

\* cited by examiner

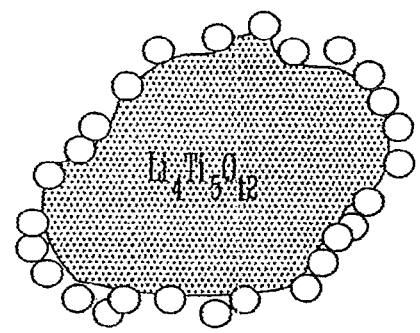
FIG_1
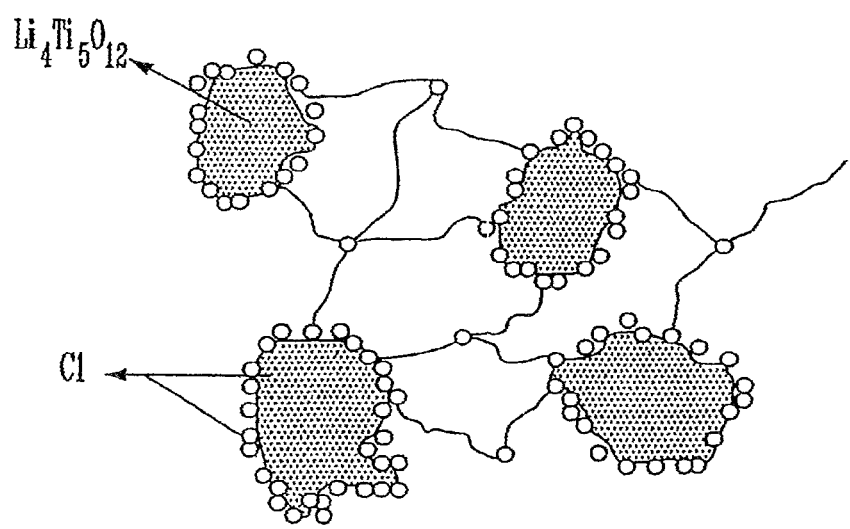
FIG_2

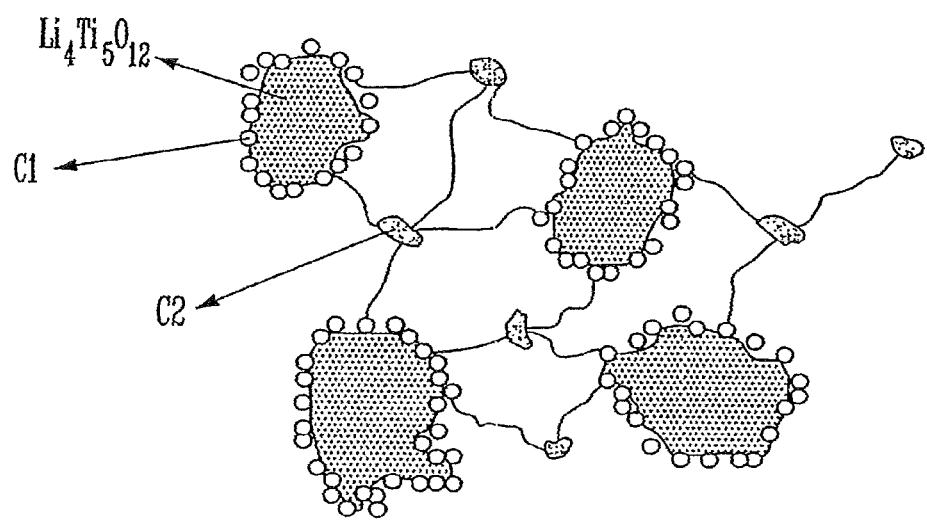
FIG_3

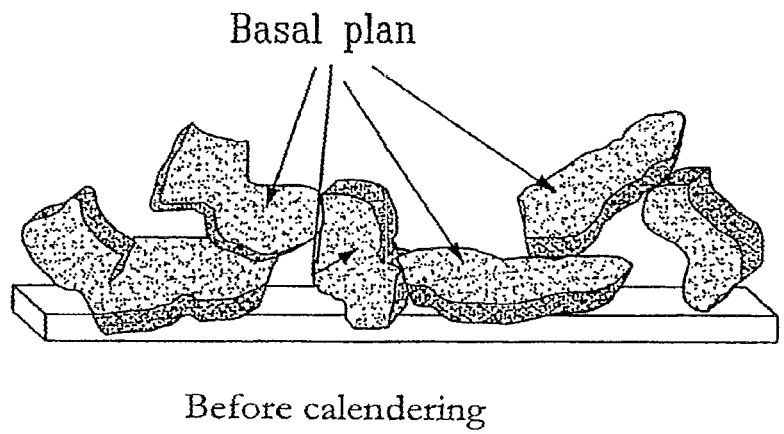
Before calendering
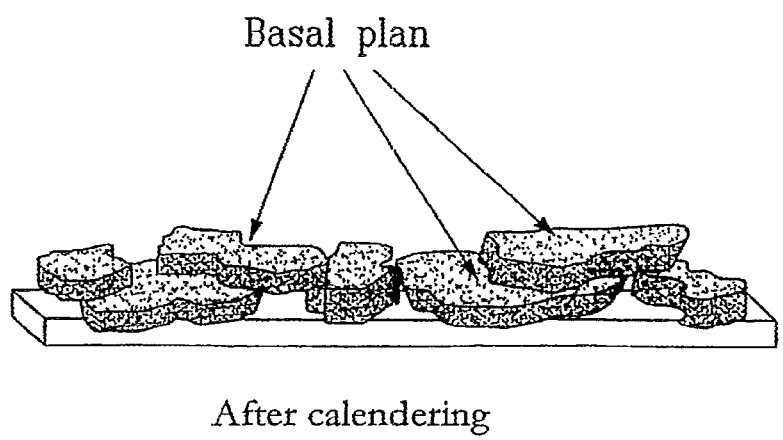
After calendering
FIG_4

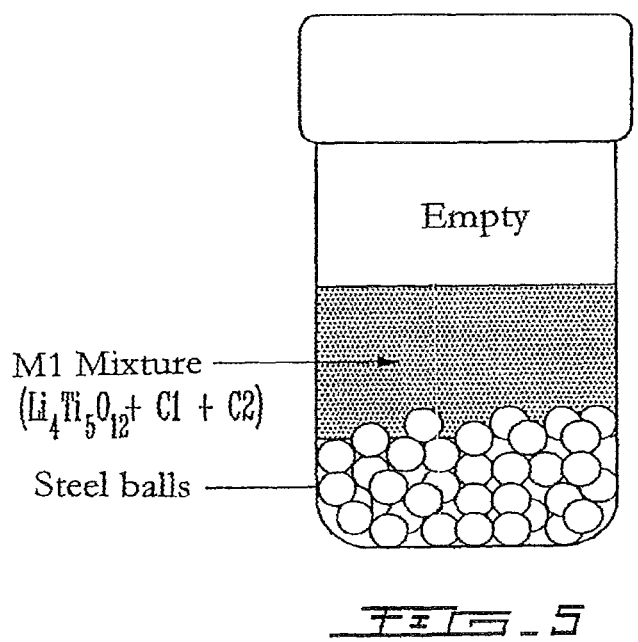
FIG_5

PARTICLES CONTAINING A NON-CONDUCTING OR SEMI-CONDUCTING NUCLEUS COVERED WITH A HYBRID CONDUCTING LAYER, THEIR PROCESSES OF PREPARATION AND USES IN ELECTROCHEMICAL DEVICES

CROSS REFERENCE TO RELATED APPLICATIONS

This application is a divisional of U.S. application Ser. No. 12/533,817, filed on Jul. 31, 2009, which is a continuation of U.S. application Ser. No. 10/521,365, filed Oct. 24, 2005, now abandoned, which is a national stage entry of International Application No. PCT/CA2003/001050, filed Jul. 10, 2003, and claims the benefit of Canadian Application No. 2,394,056, filed Jul. 12, 2002. The entire contents of each of U.S. application Ser. No. 12/533,817, U.S. application Ser. No. 10/521,365, International Application No. PCT/CA2003/001050, and Canadian Application No. 2,394,056 are hereby incorporated herein by reference in their entirety.

FIELD OF THE INVENTION

The present invention relates to mixtures of particles containing a non-conducting or semi-conducting nucleus and a hybrid conducting coating, as well as a connection of hybrid conducting chains.

The present invention also relates to processes allowing to prepare these particles and their use for example in the field of electrochemical devices, such as rechargeable electrochemical generators.

An object of the present invention consists of anodes and cathodes containing such particles and electrochemical systems, for example supercapacitors thus obtained.

STATE OF THE ART

Hydro-Quebec which is at the origin of U.S. Pat. No. 5,521,026 is one of the pioneers in the field of co-crushing carbon with oxides. In this document, the co-crushing of a carbon in the presence of a solvent is described as capable of being used to prepare materials that increase electrical conductivity of cathodes for lithium polymer batteries. Thus, an oxide of the type Vox is cocrushed with carbon black.

In PCT Application published under number WO 02/46101 A2, the synthesis of the material $Li_4Ti_5O_{12}$ is described as capable of being carried out in the presence of carbon. In this case, carbon is mainly instrumental for obtaining nano-particles and for preventing the formation of agglomerates.

BRIEF DESCRIPTION OF THE DRAWINGS

FIG. 1: is a schematic illustration of a particle of $Li_4Ti_5O_{12}$ with simple coating of carbon as obtained by the synthesis process described in WO 02/46101 A2.

FIG. 2: is a schematic illustration of a simple network of particles of $Li_4Ti_5O_{12}$ with simple coating of carbon as obtained by the synthesis process described in WO 02/46101 A2.

FIG. 3: is a schematic illustration of a network of particles, according to the present invention, containing a nucleus of $Li_4Ti_5O_{12}$ and a hybrid coating of carbon C1 and of carbon C2.

FIG. 4: shows the beneficial role of Carbon 2 with carbon orientation, when calendering.

FIG. 5: illustrates a device of the High Energy Ball Milling type used for the preparation of particles according to the invention with a nucleus of $Li_4Ti_5O_{12}$.

SUMMARY OF THE INVENTION

Figure 6:
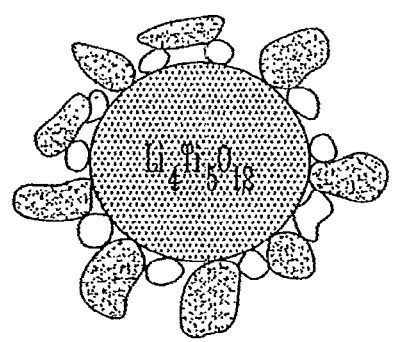
FIG. 6: is a schematic illustration of a particle whose nucleus consists of $Li_4Ti_5O_{12}$, as coated according to an embodiment of the present invention, in which the mixed hybrid conductor consists of particles of graphite and of Ketjen black.
Figure 7:
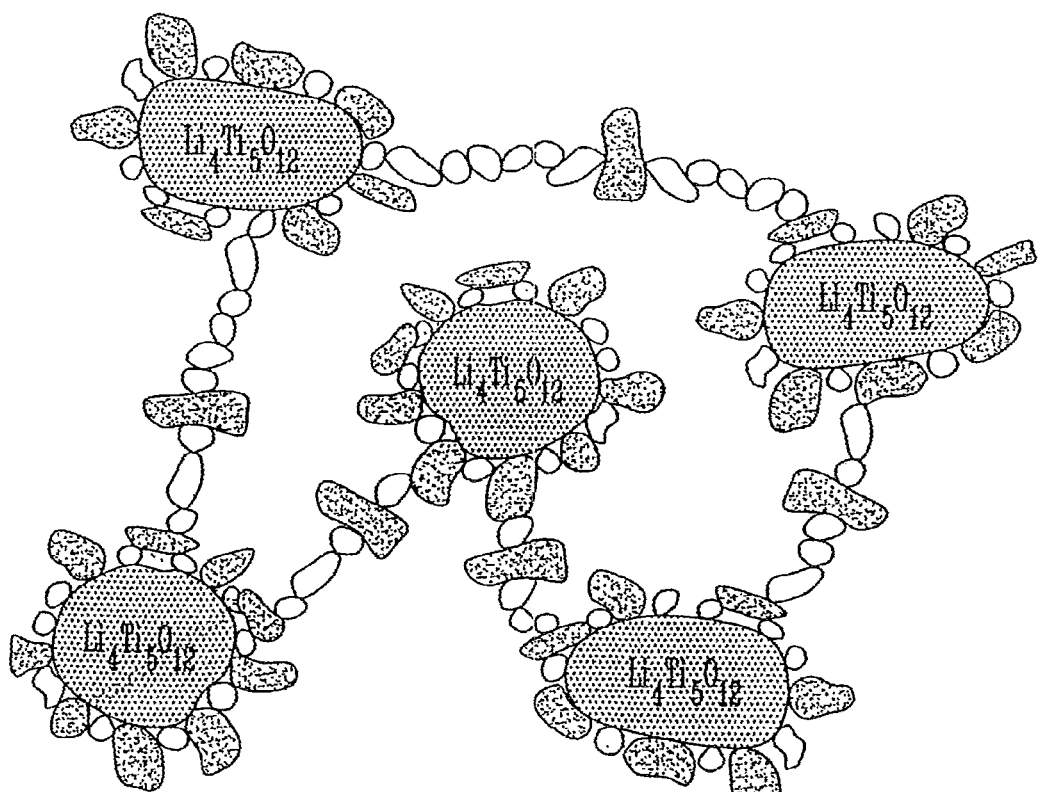
FIG. 7: is a schematic illustration of a mixture of particles according to FIG. 6/7 and the conductivity network produced at the level of these particles through conducting hybrid chains based on graphite and Ketjen black.

The present invention relates to a mixture of particles comprising a non-conducting or semi-conducting nucleus. The nuclei of these particles are covered with a hybrid conducting coating, and hybrid conducting chains located between the particles of the mixture constitute therein a conductivity network.

These mixtures of particles may be prepared by means of processes including at least the preparation of a mixture of at least one non-conducting or semi-conducting material with a conducting material, and the addition of a second conducting material to the mixture obtained; or at least the preparation of a mixture of at least one non-conducting or semi-conducting material with at least two conducting materials; or at least the preparation of a mixture of conducting materials and mixing thereof with at least one non-conducting or semi-conducting material.

In view of a very good network conductivity, a low resistivity, a very good capacity under elevated current and/or a good energy density, these particles are advantageously incorporated into the anodes and cathodes of electrochemical generators, to produce highly performing electrochemical systems.

DETAILED DESCRIPTION OF THE INVENTION

The first object of the present invention consists in a mixture of particles comprising a non-conducting or semi-conducting nucleus, the nuclei of said particles being at least partly covered with a hybrid conducting coating and said particles being at least partly connected with one another through hybrid conducting chains, i.e. by means of chains consisting of at least two types of conducting particles of different nature and that produce a network of electrical conductivity.

Electrical conductivity, i.e. the capacity of a substance to be an electrical current conductor, may be defined as the reverse of the resistivity according to the following formula:

$$\sigma = 1/\rho$$

Since the intensity of an electrical field in a material may be expressed by the formula $E=V/1$, the Ohm's law may be rewritten in terms of currents of density $J=I/A$ and one then obtains to the formula $J=\sigma E$.

On the other hand it is well known that electronic conductivity varies depending on the materials used according to an amplitude order of 27. The materials are thus divided into 3 large families:

conducting metals such that $\sigma > 10^5$ $(\Omega \cdot m)^{-1}$;
semi-conductors with $10^{-6} < \sigma < 10^5$ $(\Omega \cdot m)^{-1}$;
insulating materials such that $\sigma < 10^{-6}$ $(\Omega \cdot m)^{-1}$.

These large families are those to which reference in made within the framework of the present application.

On the other hand, within the framework of the present invention, hybrid conducting coating (also called hybrid mixture) means any coating consisting of at least two different conducting materials. The term coating includes for example the deposit of a more or less perfect layer at the surface of a particle and the more or less uniform surrounding of particles with conducting particles that are at least partially connected together.

One may also mention as coating, those that comprise a mixture of at least two different conducting materials and in particulate form, some particles of the coating of a first nucleus being interconnected with particles of the coating of a second nucleus located in the mixture of particles proximate to said first nucleus.

One may thus mention hybrid conducting coatings consisting of a layer of particles of at least two different conducting materials, a portion at least of the particles of one of the conducting materials covering a first nucleus and being interconnected with conducting particles covering a second nucleus located proximate the first nucleus in the mixture of particles, and thus producing a network of electrical conductivity.

By way of examples of such hybrid conducting coatings, within the framework of the present invention, one may mention a hybrid coating that comprises:

a first layer of particles of a first conducting material, said first layer at least partly covering, preferably between 50 and 90%, more preferably at least 80%, of the surface of said nuclei; and a second layer of particles of a second conducting material, preferably 10 to 50% (more preferably about 20%) of said particles of the second conducting material being connected together to form a network of electrical conductivity.

Advantageously, the nuclei of particles comprise a material selected from the group consisting of phosphates, nitrides, oxides or mixtures of two or more of them.

According to an advantageous embodiment, at least 70% by weight of the nucleus of particles that constitute mixtures according to the invention, preferably comprises at least one metallic oxide such as a metallic oxide in which more than 65% by weight consists of a lithium oxide.

Lithium oxide is covered or not with carbon and preferably, lithium oxide has a spinel structure.

Particularly interesting mixtures of particles are those in which the lithium oxide is selected from the group consisting of the oxides of formula:

$Li_4Ti_5O_{12}$;

$Li_{(4-\alpha)}Z_\alpha Ti_5 O_{12}$, in which a is higher than 0 and lower than or equal to 0.33; and $Li_4 Z_\beta Ti_{(5-\beta)} O_{12}$ in which $\beta$ is higher than 0 and/or lower than or equal to 0.5, Z represents a source of at least one metal preferably selected from the group consisting of Mg, Nb, Al, Zr, Ni, and Co.

Preferably, at least 65% by weight of the nucleus of these particles consists of $Li_4Ti_5O_{12}$, $Li_{(4-\alpha)}Z_\alpha Ti_5 O_{12}$, $Li_4 Z_\beta Ti_{(5-\beta)} O_{12}$ or a mixture thereof, the parameters $\alpha$ and $\beta$ being such as previously defined.

A particularly interesting sub-family of mixtures of particles according to the invention consists of mixtures in which the nucleus of particles consists of $Li_4Ti_5O_{12}$, $Li_{(4-\alpha)}Z_\alpha Ti_5 O_{12}$, $Li_4 Z_\beta Ti_{(5-\beta)} O_{12}$ or a mixture of two or more of them, with $\alpha$ and $\beta$ being such as previously defined.

Advantageously, in these particles, the constituent material of the nucleus of particles is of the semi-conductor type and it consists of at least one element selected from the group consisting of Si, Si preferably doped with Ge, Ge, InSb and a mixture thereof.

According to another variant, the nucleus of particles is a non conductor and it consists of at least one material selected from the group consisting of glasses, mica, $SiO_2$ and mixtures thereof.

In the particles according to the invention, the nuclei advantageously contain at least one of the lithium oxides covered with carbon described and/or obtained by one of the processes described in PCT Application WO 02/46101 A2, the content thereof being incorporated by reference in the present application.

Particularly interesting properties, such as electrochemical properties, are obtained by using metallic oxides of formula $LiMn_{0.5}Ni_{0.5}O_2$, $LiMn_{0.33}Ni_{0.33}Co_{0.33}O_2$, $Li_4Ti_5O_{12}$, $Li_2TiCO_3$, $LiCoO_2$, $LiNiO_2$, $LiMn_2O_4$ or mixtures thereof.

In the mixtures of particles of the invention, the carbon contents are such that the total carbon present represents 1 to 6%, preferably about 2% of the total weight of the mixture of particles.

According to a preferred embodiment, the coating of particles of the invention consists of a hybrid mixture of carbon, and/or a carbon-metal hybrid mixture.

In the case of a carbon-metal hybrid mixture, the metal may for example be selected from the group consisting of silver, aluminum and corresponding mixtures.

When the hybrid coating is of the carbon type, it advantageously comprises at least two different forms of carbon, hereinafter called Carbon 1 and Carbon 2.

Carbon 1 is then advantageously a carbon of low crystallinity. The crystallinity of the particles of Carbon 1 that are present in the mixtures of particles object of the invention, is characterized by a $d_{002}$, measured by X-ray diffraction or by Raman spectroscopy, higher than 3.39 Angstroms.

Carbon 2 is normally of the graphite type and/or of the high crystallinity carbon type. The crystallinity of the particles of Carbon 2, measured by X-ray diffraction or by Raman spectroscopy, is characterized by a $d_{002}$ that is lower than 3.36 Angstroms. Preferably, Carbon 2 is a natural, synthetic or exfoliated graphite.

Carbon 2 is advantageously selected so as to present a specific surface area measured according to the BET method, that is lower than or equal to 50 $m^2/g$ and/or with an average size that varies from 2 to 10 micrometers.

Particularly interesting electrochemical properties are also obtained with mixtures of particles in which Carbon 2 consists of at least one graphite selected from the group of synthetic graphite, natural graphite, exfoliated graphite or mixtures of these graphite.

Carbon 1 is advantageously selected so as to present a specific surface area, measured according to the BET method, that is higher than or equal to 50 $m^2/g$.

A preferred sub-family of mixtures of particles according to the invention consists of mixtures containing particles of Carbon 1 whose dimension varies from 10 to 999 nanometers.

Preferably, the weight percentage of Carbon 1 represents, in the coating made of Carbon 1 and Carbon 2, from 1 to 10% and, it is preferably substantially identical to the quantity of Carbon 1.

The sub-families made of mixtures of powders in which the average diameter of the nucleus of particles, as measured by means of a scanning microscope, varies from 50 nanometers to 50 micrometers, preferably between 4 and 10 micrometers, more preferably in which the average diameter of the particles is of the order of 2 micrometers, are of particular interest within the framework of applications in electrochemical systems.

These mixtures of particles are characterized by at least one of the following properties: a very good local conductivity, a very good network conductivity, a low resistivity, a very good capacity under elevated current and a good density of energy.

Thus, the local conductivity of the mixtures of particles according to the invention is normally higher than $10^{-6}$ (Ohm-m) and is preferably higher than or equal to $10^{-5}$ (Ohm-m), as measured by the four points method.

The network conductivity, on its part, is normally between $2.6 \times 10^{-3}$ and $6.2 \times 10^{-3}$ as measured by the four points method, and is preferably lower than $6.0 \times 10^{-3}$ (Ohm-in).

According to an advantageous embodiment, the powders of the invention have a D50 of about 7 micrometers.

A second object of the present invention resides in the process for preparing mixtures of particles in accordance with the first object of the present invention. These processes advantageously comprise at least one of the following steps:

a) preparation of a mixture of at least one non-conducting or semi-conducting material with a conducting material, and the addition of a second conducting material to the mixture obtained;

b) preparation of a mixture of at least one non-conducting or semi-conducting material with at least two conducting materials; and c) preparation of a mixture of conducting materials and mixing thereof with at least one non-conducting or semi-conducting material.

According to an advantageous embodiment for carrying out the processes of the invention, mixing of the materials is carried out by mechanical crushing of the type HEBM, Jar milling, Vapor jet milling and preferably by HEBM. These processes are normally carried out at a temperature lower than 300° C., preferably at a temperature between 20 and 40° C., more preferably at room temperature.

As a matter of fact, synthesis temperatures that are too high may cause degradation of the particle structure, for example by irreversibly deforming them such as by production of $CO_2$ from carbon present in the reaction.

According to another variant, mixing of a plurality of carbon is carried out by chemical means before the step of synthesizing $Li_4Ti_5O_{12}$.

According to another alternative, one of the conducting materials (Carbon 1) is obtained by thermal treatment of a polymer type precursor. The polymer may then be selected from the group consisting of natural polymers and modified natural polymers as well as mixtures thereof.

Thus, by way of example of polymers that can be used for the preparation of mixtures of particles of the invention, sugars, chemically modified sugars, starches, chemically modified starches, gelatinized starches, chemically modified starches, chemically modified and gelatinized starches, cellulose, chemically modified cellulose and mixtures thereof may be mentioned. By way of preferred example, cellulose acetate is mentioned.

Mixing of the plurality of carbon that is introduced in the reaction mixture may also be carried out by physical mixture, after synthesizing $Li_4Ti_5O_{12}$.

A third object of the present invention consists of cathodes, such as electrochemical generator cathodes (preferably recyclable electrochemical generators) comprising a mixture of particles such as those defined in the first object of the present invention and/or of particles that can be obtained by a process according to the second object of the present invention.

A fourth object of the present invention consists of electrochemical generator anodes (preferably recyclable electrochemical generators) comprising particles such as those defined in the first object of the present invention and/or particles that can be obtained by a process according to the third object of the present invention.

A fifth object of the present invention consists of lithium type electrochemical generators including at least one electrolyte, at least one metallic lithium anode and at least one $Li_4Ti_5O_{12}$ and/or $Li_{(4-\alpha)}Z_\alpha Ti_5O_{12}$ and/or $Li_4Z_\beta Ti_{(5-\beta)}O_{12}$, the cathode in said generator being such as defined in the third object of the present invention.

These generators are advantageously of the type that are rechargeable and/or recyclable.

Among these electrochemical generators, of particular interest are those of the lithium ion type comprising an anode as defined in the fourth object of the invention, preferably an anode of the type $Li_4Ti_5O_{12}$ and/or of the type $Li_{(4-\alpha)}Z_\alpha Ti_5O_{12}$ and/or of the type $Li_4Z_\beta Ti_{(5-\beta)}O_{12}$, and a cathode of the type $LiFePO_4$, $LiCoO_2$, $LiMn_2O_4$ and/or $LiNiO_2$.

Preferably, in these generators, the anode and/or the cathode are provided with an aluminum current collector that is full or of the Exmet type (expanded metal).

Such electrochemical generators are generally interesting in that they require no previous preparation of the battery. Advantageously, in these generators, the electrolyte is a dry polymer, a gel, a liquid or a ceramic.

A sixth object of the present invention consists of hybrid type supercapacitors comprising at least one electrolyte, at least one anode as defined in the fourth object of the invention, preferably an anode of the type $Li_4Ti_5O_{12}$ and/or of the type $L_{(4-\alpha)}Z_\alpha Ti_5O_{12}$ and/or of the type $Li_4Z_\beta Ti_{(5-\beta)}O_{12}$, and a cathode of the graphite or carbon with large specific surface area type.

These supercapacitors normally require no previous preparation of the supercapacitor.

Preferably, the supercapacitors of the invention are such that the anode and/or the cathode are provided with an aluminum current collector that is full or of the Exmet type (expanded metal).

Advantageously, also in these supercapacitors, the electrolyte is a dry polymer, a gel, a liquid or a ceramic.

The electrochemical systems according to the invention are also interesting in that they can be prepared without any addition of additional carbon.

DESCRIPTION OF PREFERRED EMBODIMENTS OF THE INVENTION

1—Addition of Carbon Particles that Constitute the Hybrid Coating after Synthesis from $Li_4Ti_5O_{12}$ $Li_4Ti_5O_{12}$ is obtained from a binary mixture of $TiO_2$ and $Li_2CO_3$ that is roasted at 850° C. during 18 hours. The $Li_4Ti_5O_{12}$ that is obtained is then mixed with two different types of carbon: a Carbon 1 also designated C1 and a Carbon 2 also designated C2.

Carbon 1: this is a carbon with low crystallinity and preferably having a specific surface area BET≥50 $M^2/g$. Carbon 1 may be a carbon black, or any other type of conducting additive.

Carbon 2: this is a carbon with high crystallinity and preferably having a BET surface area≤50 $m^2/g$. Carbon 2 may be a natural graphite or a synthetic graphite that may possibly be exfoliated.

2—Role of the Two Carbon

Carbon 1: the role is double. The first one is to coat the particle so as to ensure a local conductivity of the particle as this will appear on FIG. 1/7.

The second role of the low crystallinity carbon is to form a conductivity network between the particles of the same type as those illustrated in FIG. 1/7, which ensures conductivity in the electrode. Indeed, preparation of the electrode is carried out without any carbon additive.

The electronic network and the inter-particle conductivity are also ensured by Carbon 1 as this will appear also from FIG. 2/7.

Carbon 2: Carbon 2 is a graphite type of carbon and it allows first, surprisingly, to improve conductivity of the electrode by forming constitutive knots of homogenous distribution stations of electrical conductivity. These stations appear in the illustration of FIG. 3/7.

The good conductivity of graphite allows to decrease the resistivity of the electrode, which advantageously allows the battery to operate under high current densities.

The second role of graphite is with respect to the process. Graphite has the characteristics of a lubricating and hydrophobic material. When spreading the electrode, graphite allows to control the porosity of the electrode. Such a roller leveling of the electrodes moreover allows to orient the particles towards the basal plan, as this appears on FIG. 4/7, i.e. parallel to the surface of the electrode support; which provides a maximum conductivity to the electrode.

During the extrusion process, because of its lubricating properties, graphite permits an ease of extrusion as well as a homogenous thickness for the electrode. Moreover, it increases extrusion speed. These technical advantages result in a reduced cost for the production of the electrodes. In addition, when it is used for the preparation of electrodes under dry conditions, graphite helps in lubricating the nozzle tip of the extruder and makes it possible to prevent metal deposits at the surface of the nozzle tip.

3—Preparation of the Particles

Tertiary Mixture:

According to an advantageous embodiment of the present invention, a ternary mixture comprising ($M_1$) ($Li_4Ti_5O_{12}$+C1+C2) is obtained by high energy crushing HEMB (High Energy Ball Mill). For this purpose, a metal crucible is used. The $M_1$ mixture is introduced in the crucible, and steel balls in a free volume ratio of 1/3, 1/3 and 1/3 are disposed in the crucible as illustrated in FIG. 5/7.

The conditions of mixing by HEBM are very important, one of the most important is to prevent destruction of the crystallinity of Carbon C2. Indeed, the particle size of carbon C2 must not decrease below 1 micrometer.

4—Preparation of the Electrode

The electrode is prepared from a mixture of $M_1$ and PVDF. This mixture is carried out in a ternary solvent comprising N-methylpyiTolydone (NMP), acetone, toluene, as this is described in the patent of Hydro-Quebec WO 01/97303 A1 the content thereof being incorporated by reference in the present application.

The conductivity of the paste obtained is intrinsically ensured par the $M_1$ mixture ($Li_4Ti_5O_{12}$+C1+C2), without adding additional carbon which has a positive impact on the energy density of the battery which in this case is not penalized by the additional weight of another source of carbon.

5—Advantage of the Synthesis of $Li_4Ti_5O_{12}$

In this case, the quaternary mixture ($M_2$) comprises $TiO_2$, $Li_2CO_3$, C2 carbon (graphite) and a carbon precursor (polymer or other).

The $M_2$ mixture is then introduced into a metallic crucible. A co-crushing of the HEBM type is carried out in order to obtain an intimate mixture. The mixture obtained is thereafter placed in a quartz tube to be heated therein. Synthesis is then finalized in the presence of an inert atmosphere in order to carbonize the polymer.

Once the synthesis is over, the $Li_4Ti_5O_{12}$ product is coated with low crystallinity carbon and high crystallinity graphite. Preparation of the electrodes is equivalent to that described in paragraph 4 hereinabove.

EXAMPLES

The examples which follows are given by way of illustration and must not be interpreted as constituting any kind of limitation of the definition of the invention.

Example 1

A mixture of $Li_4Ti_5O_{12}$, Ketjen black and a natural graphite of Brazilian source, in a volume ratio of 80.77/7.32/2.5 is crushed by HEBM during 1 hour. Particles having a nucleus of $Li_4Ti_5O_{12}$, whose average size is 5 micrometers, and with a hybrid coating of graphite and Ketjen black are thus obtained. Their average thickness is 2 micrometers.

Example 2

A mixture of $Li_4Ti_5O_{12}$, Ketjen black and graphite in a volume ratio of 40/2.5/2.5 is prepared by the method described in preceding example 1.

Example 3

A mixture of $Li_4Ti_5O_{12}$, Ketjen black and graphite in a volume ratio of 81.06/3.51/2.5 is prepared as in example #1. The total weight of carbon added corresponds to about 6% of the weight of the total mixture.

Example 4

A mixture of $LiMn_{0.5}Ni_{0.5}O_2$, that is non conducting, Ketjen black and natural graphite of Brazilian source in a weight ratio of 94/3/3 is crushed by Hosokawa Mechanofusion during 1 hour. The particles obtained have a nucleus of $LiMn_{0.5}Ni_{0.5}O_2$, an average size of 7 .mu.m and a hybrid coating of graphite+Ketjen black and a thickness of 3 .mu.m. Resistivity of the coated material, measured by the four point method, is $5 \times 10^{-4}$ Ohm-m.

Determinations of electrochemical performances of the particles prepared are reported in the following table 1.

TABLE 1

| Examples | Particle size | Resistivity Ohm-m | C/24 Capacity in mAh/g |
|---|---|---|---|
| 1 | 7 | $6 \times 10^{-3}$ | 165 |
| 2 | 7 | $2 \times 10^{-3}$ | 160 |
| 3 | 7 | $4 \times 10^{-3}$ | 162 |
| 4 | 7 | $9 \times 10^{-3}$ | 200 |

The high levels of electrochemical properties shown for example by means of these examples are used to prepare highly performing electrochemical systems.

Although the present invention has been described by way of specific embodiments, it is understood that many variations and modifications may be associated with said embodiments, and the present invention aims at covering such modifications, uses or adaptations of the present invention following in general, the principles of the invention and including any variation of the present description which will become known or is conventional in the field of activity of the present invention, and which may apply to the essential elements mentioned above, in accordance with the scope of the following claims.

The invention claimed is:

1. Mixture of particles comprising a non-conducting or semi-conducting nucleus, the nuclei of said particles being at least partially covered with a hybrid conductor coating and said particles being at least partially connected through hybrid conducting chains which provide a network of electrical conductivity, wherein:

the nucleus of said particles is at least 65% of one lithium oxide selected from the group consisting of oxides of the formula:

$Li_{(4-\alpha)}Z_\alpha Ti_5 O_{12}$, in which $0<\alpha\leq 0.33$, Z represents a source of at least one metal; and $Li_4 Z_\beta Ti_{(5-\beta)} O_{12}$ in which $0<\beta\leq 0.5$, Z represents at least one metal;

each of the hybrid conductor coating and the hybrid conducting chains is a hybrid carbon mixture which comprises at least two different conducting forms of carbon, which are hereunder designated Carbon 1 and Carbon 2, wherein:

Carbon 1 consists of particles with low crystallinity having a d002 greater than 3.36 Å if measured by X-ray diffraction or by Raman spectroscopy, said Carbon 1 possesses a specific surface area which, as measured by the BET method, is equal to or greater than 50 m²/g, and particles of Carbon 1 have an average size varying from 10 to 999 nm, and Carbon 2 consists of at least one of graphite particles and high crystallinity carbon particles with high crystallinity having a d002 smaller than 3.36 Å if measured by X-ray diffraction, particles of Carbon 2 have a specific surface area which, as measured by the BET method, is equal to or smaller than 50 m²/g, and the particles of Carbon 2 have a size varying from 2 to 10 μm, wherein the hybrid conductor coating comprises:
a first, inner coating of Carbon 1 which covers between 50 and 90% of the surface of the nucleus, and
a second, outer coating of Carbon 2.

2. Mixture of particles according to claim 1, in which the second, outer coating of Carbon 2 comprises particles are connected together to constitute an electrical conductivity network.

3. Mixture according to claim 1, in which the particles have a $D_{50}$ of about 7 micrometers.

4. Mixture according to claim 1, in which Z represents a particle of a metal selected from the group consisting of Mg, Nb, Al, Zr, Ni and Co.

5. Mixture according to claim 1, containing from 1 to 6% by weight of carbon in said mixture.

6. Mixture according to claim 5, containing about 2% by weight of carbon in said mixture.

7. Mixture according to claim 1, in which Carbon 2 is at least one graphite selected from the group consisting of synthetic graphite, natural graphite, exfoliated graphite and mixtures of two or more of these graphite.

8. Mixture according to claim 1, in which the weight percentage of Carbon 1 represents from 1 to 10% of the total weight of the coating composed of Carbon 1 and Carbon 2.

9. Mixture according to claim 1, in which the quantity of Carbon 1 is substantially identical to the quantity of Carbon 2.

10. Mixture according to claim 1, in which the average diameter of the nucleus of said particles varies from 50 nanometers to 30 micrometers.

11. Mixture according to claim 10, wherein the average diameter of said nucleus is of the order of about 2 micrometers.

12. Mixture according to claim 1, in which the average size of said particles, measured according to the electronic scanning microscope method, is between 4 and 30 micrometers.

13. Mixture according to claim 1, having at least one of the following properties: a very good local conductivity, a very good network conductivity, a low resistivity, a very good capacity under elevated current and a good density of energy.

14. Mixture according to claim 11, having a local conductivity, measured according to the four point method, that is higher than $10^{-6}$ (Ohm-m).

15. Mixture of particles according to claim 13, having a network conductivity, measured according to the four point method, that is between $2.6\times 10^{-3}$ and $6.2\times 10^{-3}$.

16. Cathode for electrochemical generator comprising a mixture of particles as defined in claim 1.

17. Anode for electrochemical generator comprising particles as defined in claim 1.

18. Electrochemical generator of the lithium type including at least one metallic lithium anode and at least one cathode as defined in claim 16.

19. Electrochemical generator according to claim 18, preferably of the rechargeable and/or recyclable type.

20. Electrochemical generator of the lithium type including at least one metallic lithium anode as defined in claim 16, at least one cathode and comprising at least one electrolyte.

21. Electrochemical generator according to claim 18, in which at least one anode and/or at least one cathode are provided with an aluminum current collector that is full or of the Exmet type (expanded metal).

22. Electrochemical generator according to claim 18 requiring no previous preparation of the battery.

23. Generator according to claim 18, in which the electrolyte is a dry polymer, a gel, a liquid or a ceramic.

24. Electrochemical system according to claim 18, wherein the electrode is prepared without any addition of additional carbon.

25. Mixture according to claim 1, in which at least some of the particles of Carbon 2 are connected together to constitute an electrical conductivity network.

26. Mixture according to claim 1, in which about 80% of Carbon 1 is covering the surface of said nuclei; and about 20% of the particles of Carbon 2 are connected together to constitute an electrical conductivity network.

27. Mixture according to claim 1, in which the nucleus of said particles consists for at least 70% of at least one metal oxide.

28. Mixture according to claim 11, having a local conductivity, measured according to the four point method, that is higher than or equal to $10^{-5}$ (Ohm-m).

29. Mixture of particles according to claim 13, having a network conductivity, measured according to the four point method, that is lower than about $6.0 \times 10^{-03}$ (Ohm-m).

30. Electrochemical generator according to claim 18, in which the anode is of the $Li_4Ti_5O_{12}$ and/or $Li_{(4-\alpha)}Z_\alpha Ti_5O_{12}$ and/or $Li_4Z_\beta Ti_{(5-\beta)}O_{12}$ type.

31. Electrochemical generator according to claim 18, in which the anode is of the $Li_4Ti_5O_{12}$ and/or $Li_{(4-\alpha)}Z_\alpha Ti_5O_{12}$ and/or $Li_4Z_\beta Ti_{(5-\beta)}O_{12}$ type; and the cathode is of the $LiFePO_4$, $LiCoO_2$, $LiMn_2O_4$ and/or $LiNiO_2$ type.

* * * * *